United States Patent
Newman et al.

(10) Patent No.: US 6,675,826 B1
(45) Date of Patent: Jan. 13, 2004

(54) AUTOMATIC FLOOD PREVENTION SYSTEM

(76) Inventors: Frederic M. Newman, 8201 W. County Rd. 55, Midland, TX (US) 79707; Richie D. Sites, 4308 Boulder Dr., Midland, TX (US) 79707

( * ) Notice: Subject to any disclaimer, the term of this patent is extended or adjusted under 35 U.S.C. 154(b) by 0 days.

(21) Appl. No.: 10/351,037

(22) Filed: Jan. 25, 2003

(51) Int. Cl.[7] .............. F16K 17/00; F16K 31/02; H01H 29/06; H01H 35/18

(52) U.S. Cl. ............ 137/312; 137/15.11; 137/392; 137/558; 137/624.12; 137/624.13; 122/504.2; 122/507; 307/118; 340/604; 340/605; 340/620; 361/178

(58) Field of Search ............ 137/15.11, 240, 137/312, 387, 392, 558, 624.11, 624.12, 624.13; 73/304 R, 313; 200/61.04, 61.05; 340/604, 605, 620; 122/504, 504.2, 507; 361/178

(56) References Cited

U.S. PATENT DOCUMENTS

| | | | |
|---|---|---|---|
| 3,768,771 A | | 10/1973 | Dicken, Jr. |
| 3,989,066 A | | 11/1976 | Sturman et al. |
| 4,108,419 A | | 8/1978 | Sturman et al. |
| 4,228,427 A | | 10/1980 | Niedermeyer |
| 4,305,420 A | * | 12/1981 | Nussdorf ............ 137/312 |
| 4,324,268 A | | 4/1982 | Jacobson |
| 4,498,203 A | | 2/1985 | Barnum et al. |
| 4,730,637 A | | 3/1988 | White |
| 4,796,658 A | * | 1/1989 | Caple ............ 137/312 |
| 4,805,662 A | * | 2/1989 | Moody ............ 137/312 |
| 4,915,347 A | | 4/1990 | Iqbal et al. |
| 4,944,253 A | * | 7/1990 | Bellofatto ............ 137/312 |
| 5,086,806 A | | 2/1992 | Engler et al. |
| 5,113,892 A | | 5/1992 | Hull et al. |
| 5,240,022 A | * | 8/1993 | Franklin ............ 137/312 |
| 5,402,815 A | | 4/1995 | Hoch, Jr. et al. |
| 5,431,181 A | | 7/1995 | Saadi et al. |
| 5,584,465 A | * | 12/1996 | Ochsenreiter ............ 251/65 |
| 5,632,302 A | * | 5/1997 | Lenoir ............ 137/312 |
| 5,857,482 A | * | 1/1999 | Dowling ............ 137/312 |
| 5,934,302 A | * | 8/1999 | Nemelka ............ 137/78.1 |
| 5,992,218 A | * | 11/1999 | Tryba et al. ............ 137/312 |
| 5,992,443 A | * | 11/1999 | Rodriguez ............ 137/312 |
| 6,073,904 A | * | 6/2000 | Diller et al. ............ 251/30.03 |
| 6,105,607 A | | 8/2000 | Caise et al. |
| 6,147,613 A | * | 11/2000 | Doumit ............ 340/605 |
| 6,209,576 B1 | | 4/2001 | Davis |
| 6,389,852 B1 | | 5/2002 | Montgomery |
| 6,489,895 B1 | * | 12/2002 | Apelman ............ 340/605 |
| 6,523,562 B2 | * | 2/2003 | Harper ............ 137/312 |

FOREIGN PATENT DOCUMENTS

| | | |
|---|---|---|
| EP | 0793042 A1 | 3/1997 |
| JP | 58021076 | 7/1983 |

\* cited by examiner

*Primary Examiner*—George L. Walton
(74) *Attorney, Agent, or Firm*—Robert J. Harter

(57) ABSTRACT

A flood prevention system includes a double-latching solenoid valve that shuts off a water supply line in response to a moisture sensor detecting a leak in a plumbing system. The double-latching feature provides the solenoid's plunger with two positions of equilibrium. This minimizes electrical power consumption so that the flood prevention system can be battery operated. To minimize a buildup of hard water deposits, the valve includes a flexible diaphragm and is cycled periodically regardless of whether flooding occurs. The sensor includes multiple methods of mounting to a floor.

6 Claims, 3 Drawing Sheets

AUTOMATIC FLOOD PREVENTION SYSTEM

BACKGROUND OF THE INVENTION

1. Field of the Invention

The subject invention generally pertains to water control valves and more specifically to a system for automatically closing a valve in response to sensing a flooding condition.

2. Description of Related Art

Various systems have been developed to prevent flooding caused by a leak in a building's plumbing system. Without flood protection, even a small leak in a water line, water heater, or washing machine can cause substantial damage to a home if the leak occurs while the family is gone on vacation or if the house is left vacant for another reason. Thus, flood prevention systems preferably operate reliably and without attendance 24 hours a day, seven days a week for months or even years.

If a normally open valve is used to shutoff the water supply in response to a leak, it may be years before the valve is ever energized. During the extended period of inactivity, working members of the valve may deteriorate or become jammed with hard water deposits, and the problem may not be discovered until flooding occurs.

If a normally closed valve is used, the valve may need to be kept energized continuously for years, which could make a battery-operated system impractical. If a power failure occurs, the valve may close and leave a family without water as well.

If a flood prevention system includes a moisture sensor, the method of mounting such a sensor can be important. If the sensor is simply placed on the floor, the sensor may get washed away or otherwise dislodged. On the other hand, if the sensor is permanently attached to the floor, routine mopping of the floor may trigger the system, and the sensor may be difficult to dry until the floor dries.

SUMMARY OF THE INVENTION

To provide an improved flood prevention system, an object of some embodiments is to minimize the power consumption of the overall system.

Another object of some embodiments is to use a shutoff valve with a solenoid having two equilibrium positions, whereby the valve can maintain its open and closed positions without electrical current.

Another object of some embodiments is to provide a flood prevention system that uses such a minimal amount of current that the system can be battery operated.

Another object of some embodiments is to use a touch-and-hold fastener for removably attaching a moisture sensor to a floor.

Another object of some embodiments is to use an adhesive to hold a portion of the touch-and-hold fastener to the floor.

Another object of some embodiments is to provide a moisture sensor with a screw-receiving hole that offers second choice of attaching the sensor to the floor.

Another object of some embodiments is to periodically cycle the shutoff valve of a flood prevention system to help clear the valve of any hard water deposits.

Another object of some embodiments is to open and close a solenoid valve by simply reversing the polarity of the voltage used for actuating valve.

Another object of some embodiments is to minimize the electrical power required to actuate a valve by using a valve that is pilot operated.

Another object of some embodiments is use a valve having a diaphragm that is more flexible than hard water deposits, whereby the hard water deposits may tend to break off and separate from the diaphragm.

One or more of these and other objects of the invention are provided by a flood prevention system that includes double-latching shutoff valve that responds to a moisture sensor. To minimize a buildup of hard water deposits, the valve includes a flexible diaphragm and is cycled periodically. The sensor includes multiple methods of mounting to a floor.

DESCRIPTION OF THE PREFERRED EMBODIMENT

Figure 1:
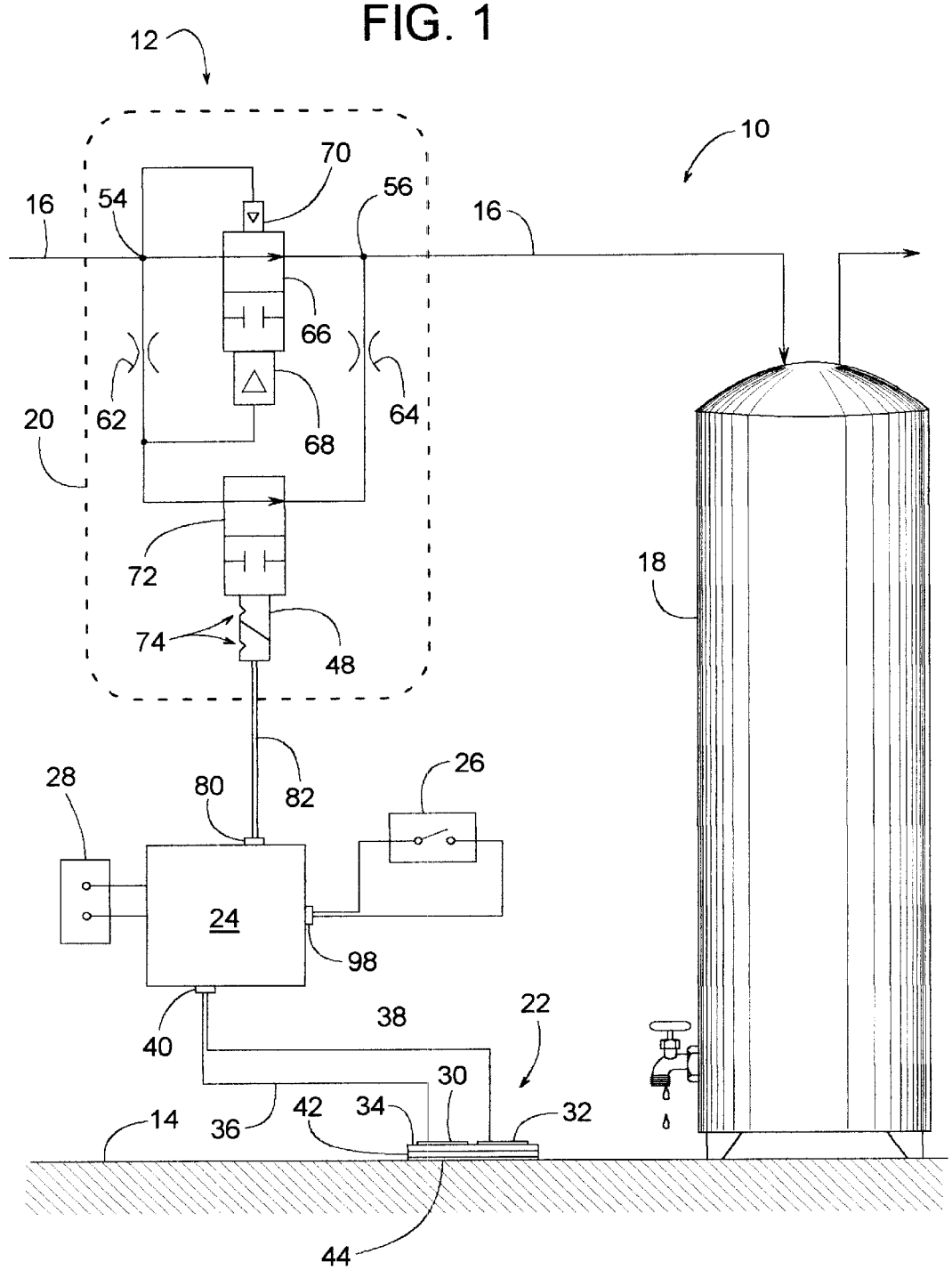
FIG. 1 is a schematic diagram of an automatic flood prevention system.

Referring to FIGS. 1–5, a plumbing system 10 is provided with a flood prevention system 12 that helps prevent a leak in plumbing system 10 from flooding a floor 14. Plumbing system 10 can be any network of pipes that includes a water supply line 16 that feeds various water-handling appliances such as a water heater 18, clothes washer, dishwasher, water softener, toilet, bathtub, shower, sink, etc. Flood prevention system 12 comprises a shutoff valve 20 connected to supply line 16, a moisture sensor 22 for detecting water on floor 14, and a controller 24 that controls the operation of valve 20 in response to moisture sensor 22 and a manual reset 26.

Controller 24 is schematically illustrated to represent any logic device adapted to provide one or more outputs in response to one or more inputs. Examples of controller 24 include, but are not limited to, a computer, microcomputer, microprocessor, PLC (programmable logic controller), dedicated analog or digital circuit, and various combinations thereof In some embodiments of the invention, controller 24 includes a PIC16C711-04/P-ND programmable chip by Microchip of Chandler, Ariz. Controller 24 is shown connected to an electrical power source 28, which in some embodiments is a battery or an electrical outlet.

Moisture sensor 22 includes two or more spaced-apart, electrically conductive surfaces 30 and 32 that overlay a relatively nonconductive base plate 34. Two wires 36 and 38 connect surfaces 30 and 32 to an input 40 of controller 24. To detect moisture, controller 24 determines whether the electrical resistance across surfaces 30 and 32 has dropped to a predetermined limit (e.g., 40 kohms), which would indicate that sufficient moisture exists to create a conductive path between surfaces 30 and 32.

To install sensor 22, a touch-and-hold fastener 42, such as VELCRO, is attached to the underside of base plate 34. An upper portion of fastener 42 is bonded to the underside of plate 34, while a mating lower portion of fastener 42 has an adhesive 44 for bonding to floor 14. As with conventional touch-and-hold fasteners, the two portions of fastener 42 releasably engage each other, which allows base plate 34 to be removably attached to floor 14. Base plate 34 also includes a screw-receiving hole 46 that allows a screw, nail, or other type of fastener to mount sensor 22 more securely to floor 14.

To minimize electrical power consumption, shutoff valve 20 is a pilot-operated valve actuated by a double-latching solenoid 48. The term, "double-latching" refers to a solenoid with a plunger 50 having two positions of equilibrium. That is, electrical power is used to move plunger 50 between its two positions; however, electrical power is not needed to hold plunger 50 at either of its two positions. In some embodiments, a positive voltage pulse retracts plunger 50 to open valve 20, and a negative voltage pulse extends plunger 50 to close the valve. An example of such a solenoid can be found on a Series-993 solenoid valve provided by Evolutionary Concepts, Inc., of San Dimas, Calif. The valve portion without the solenoid can be provided by the B & C Valve Company, International, of Shawnee Mission, Kans.

Figure 2:
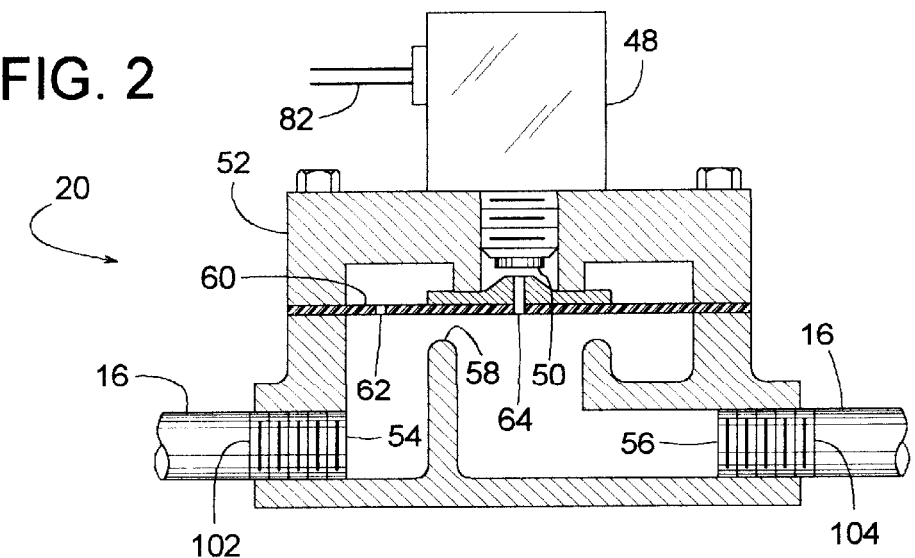
FIG. 2 is a cross-sectional view of a shutoff valve in an open position.
Figure 3:
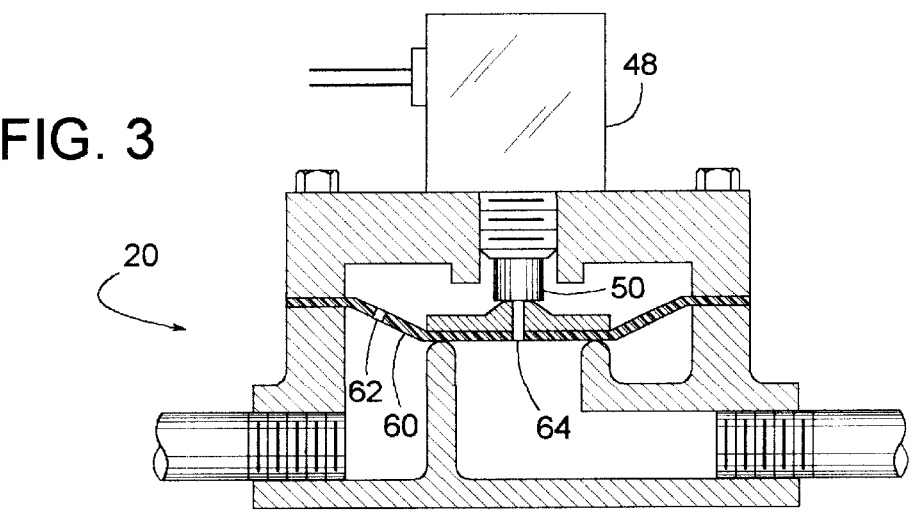
FIG. 3 is the same as FIG. 2 but with the valve closed.
Figure 4:
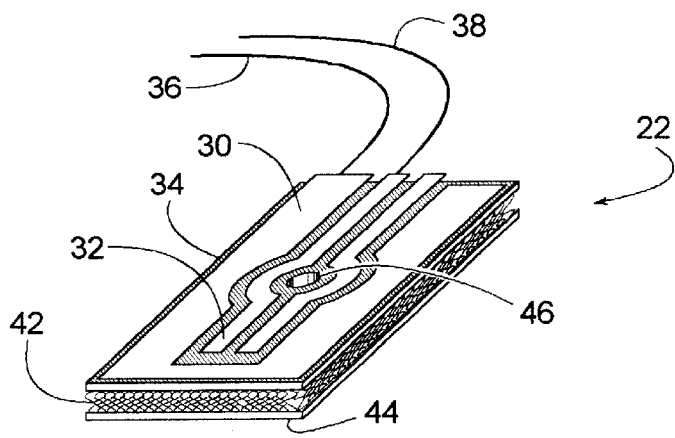
FIG. 4 is a perspective view of a moisture sensor.

Valve 20 comprises a valve body 52 having a water inlet 54 and a water outlet 56. To selectively open and close the passageway between inlet 54 and outlet 56, valve 20 includes a valve seat 58 with an adjacent diaphragm 60 that can move between an open position (FIG. 2) and a closed position (FIG. 3). Diaphragm 60 includes two orifices 62 and 64, which help determine the pilot pressure that pushes down against diaphragm 60. Orifice 62, being open to inlet 54, tends to feed the pilot pressure. Orifice 64, on the other hand, tends to bleed off the pilot pressure when orifice 64 is open. When plunger 50 retracts, as shown in FIG. 2, orifice 64 is open to reduce the pilot pressure, whereby the water pressure underneath diaphragm 60 is sufficient to hold the diaphragm up and away from valve seat 58. When plunger 50 extends, as shown in FIG. 3, it closes orifice 64. However, since orifice 62 still remains open, pilot pressure builds up across substantially the entire upper surface of diaphragm 60, which pushes diaphragm 60 down against valve seat 58. By using water pressure to open and close valve 20, less electrical power is needed, so a battery-operated system becomes more feasible.

Valve 20 is schematically illustrated in FIG. 1, wherein valve 66 represents the opening and closing of diaphragm 62 relative to valve seat 58, item 68 represents the pilot pressure that pushes downward against diaphragm 60, item 70 represents the pilot pressure that pushes upward against diaphragm 62, valve 72 represents plunger 50 opening and closing orifice 64, and detents 74 represent the two equilibrium positions of the solenoid's plunger 50.

Figure 5:
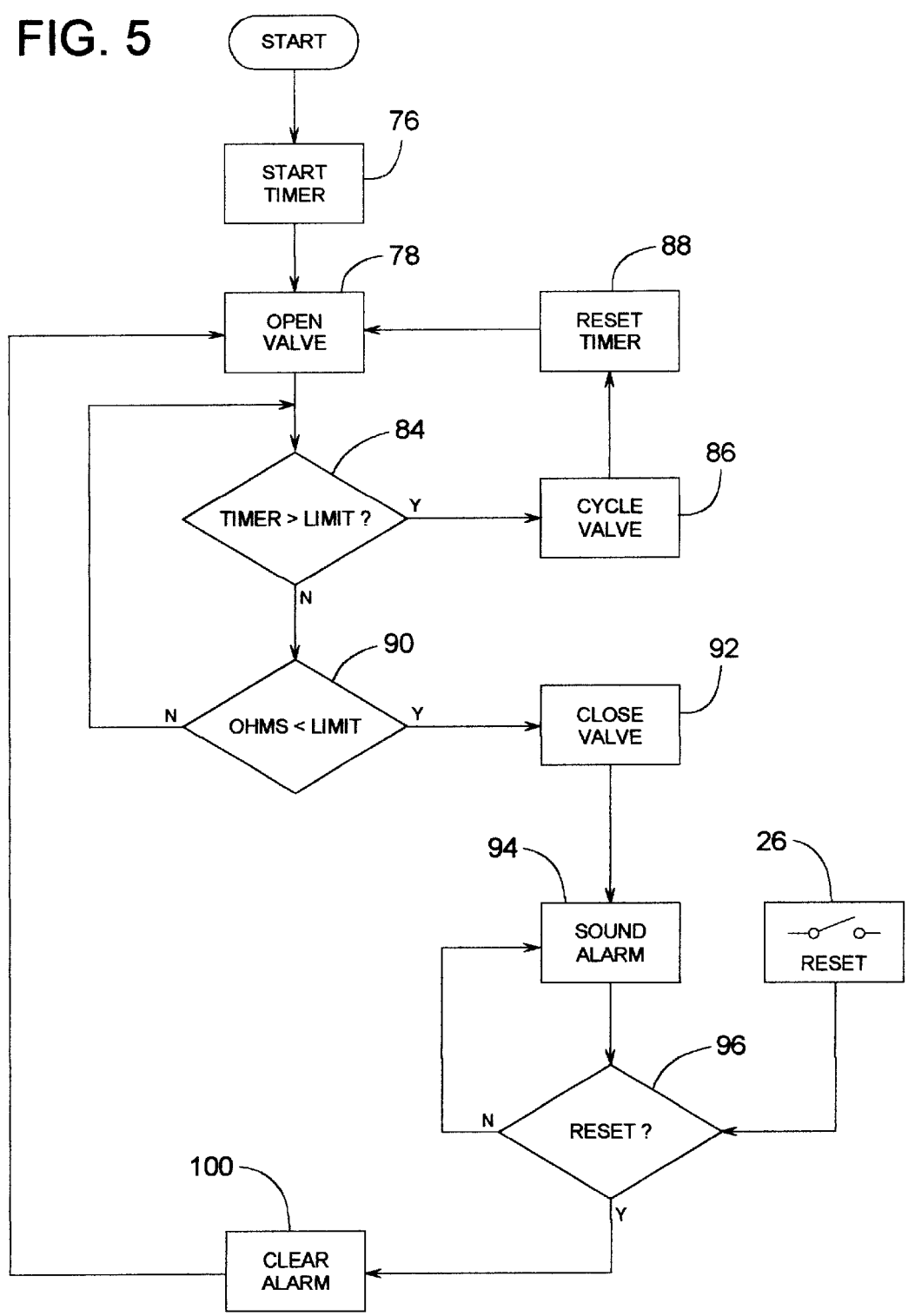
FIG. 5 is a control algorithm of a controller used in the system of FIG. 1.

To control the operation of system 12, controller 24 may follow the algorithm of FIG. 5. The process begins with block 76 starting a timer and block 78 opening valve 20. To open valve 20, controller 24 provides at output 80 a momentary valve-opening signal, such as 50-msec 12-volt positive voltage pulse. Wires 82 then convey the voltage pulse to solenoid 48 to retract plunger 50. In some embodiments, controller 24 provides a brief negative voltage pulse immediately preceding the positive pulse. The brief negative pulse helps initiate movement of plunger 50; however, the positive pulse is still used to fully retract the plunger.

Next, logic block 84 determines whether the timer has reached a predetermined limit (e.g., a 20-day period). If so, block 86 cycles valve 20 a few times to help clear the valve of any hard water deposits. Block 88 then resets the timer to start another 20-day period, and the logic returns to block 78 to ensure that valve 20 is open after the cycling process.

If the timer has not expired, decision block 90 determines whether the electrical resistance of sensor 22 is less than a predetermined limit (e.g., 40 kilo-ohms). If sensor 22 is dry, the logic returns to block 84. If, however, sensor 22 is wet and its electrical resistance is below the predetermined limit, block 92 closes valve 20 by providing a momentary valve-closing signal at output 80. The valve-closing signal may be a 50-msec 12-volt negative voltage pulse, which extends plunger 50, as shown in FIG. 3. In addition, block 94 energizes an audible and/or visual alarm. Valve 20 remains closed and the alarm remains on until block 96 determines that reset 26 has been actuated. Reset 26 can simply be a manually operated electrical switch that is wired to an input 98 of controller 24. Once reset, block 100 de-energizes the alarm, and the logic returns to block 78. Block 78 then reopens valve 20 to restart the flood monitoring process.

Pipe threads 102 and 104 of FIG. 2 illustrate connecting double-latching solenoid valve 20 to water supply line 16; block 78 of FIG. 5 illustrates opening the double-latching solenoid valve by providing a first momentary voltage signal thereto; leaving block 78 illustrates discontinuing the first momentary voltage signal while leaving the double-latching solenoid valve open; block 90 illustrates sensing moisture adjacent to the floor; in response to sensing moisture on the floor, block 92 following block 90 illustrates closing the double-latching solenoid valve by providing a second momentary voltage signal thereto; leaving block 92 illustrates discontinuing the second momentary voltage signal while leaving the double-latching solenoid valve closed; and block 86 illustrates periodically cycling the double-latching solenoid valve during a period when substantially no moisture is sensed.

Although the invention is described with reference to a preferred embodiment, it should be appreciated by those skilled in the art that various modifications are well within the scope of the invention. For example, the illustrated algorithm is just one of many control schemes that can be used, and various other algorithms can be readily applied by those skilled in the art. Therefore, the scope of the invention is to be determined by reference to the claims that follow.

We claim:

1. A flood prevention system responsive to moisture on a floor, comprising:

a valve body defining a water inlet and a water outlet;

a diaphragm disposed within the valve body and being selectively movable to an open position and a closed position, wherein the diaphragm in the open position places the water inlet in fluid communication with the water outlet, and the diaphragm in the closed position provides a flow obstruction between the water inlet and the water outlet;

a double-latching solenoid attached to the valve body and having a plunger that is selectively movable to a first equilibrium position and a second equilibrium position, wherein the plunger in the first equilibrium position causes the diaphragm to move to the closed position, and wherein the plunger in the second equilibrium position causes the diaphragm to move to the open position;

a moisture sensor having an electrical conductivity that changes in response to being exposed to moisture, whereby the moisture sensor provides a moisture signal that that varies with the electrical conductivity;

a touch-and-hold fastener attached to the moisture sensor;

an adhesive on the touch-and-hold fastener; wherein the adhesive can adhere to the floor while the touch-and-hold fastener facilitates removably attaching the moisture sensor to the floor; and a controller having an input, an output, and a manual reset with the input being electrically coupled to the moisture sensor to receive the moisture signal and the output being electrically coupled to the double-latching solenoid, wherein the controller responds to the moisture signal reaching a predetermined limit by providing at the output a first momentary valve-closing signal that shifts the plunger to the first equilibrium position, and the controller responds to actuation of the manual reset by providing at the output a second momentary valve-opening signal that shifts the plunger to the second equilibrium position.

2. The method of claim 1, wherein the first momentary voltage signal has a polarity that is opposite that of the second momentary voltage signal.

3. The flood prevention system of claim 1, wherein the moisture sensor defines a screw-receiving mounting hole that overlays the touch-and-hold fastener, whereby the screw-receiving mounting hole further facilitates attaching the moisture sensor to the floor.

4. The flood prevention system of claim 1, further comprising a timer that signals the controller to periodically cycle double-latching solenoid valve even though the moisture sensor may not have sensed moisture.

5. The flood prevention system of claim 1, further comprising a battery that provides electrical power to the controller.

6. A method of controlling a double-latching solenoid valve to prevent a water supply line from completely flooding a floor, comprising:

connecting the double-latching solenoid valve to the water supply line;

opening the double-latching solenoid valve by providing a first momentary voltage signal thereto;

discontinuing the first momentary voltage signal while leaving the double-latching solenoid valve open;

sensing moisture adjacent to the floor;

in response to sensing moisture on the floor, closing the double-latching solenoid valve by providing a second momentary voltage signal thereto;

discontinuing the second momentary voltage signal while leaving the double-latching solenoid valve closed; and periodically cycling the double-latching solenoid valve during a period when substantially no moisture is sensed, whereby the periodic cycling helps loosen hard water deposits that may accumulate inside the double-latching solenoid valve.

* * * * *